US006593943B1

(12) United States Patent
MacPhail

(10) Patent No.: US 6,593,943 B1
(45) Date of Patent: Jul. 15, 2003

(54) INFORMATION GROUPING CONFIGURATION FOR USE WITH DIVERSE DISPLAY DEVICES

(75) Inventor: Margaret Gardner MacPhail, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/451,946

(22) Filed: Nov. 30, 1999

(51) Int. Cl.[7] .................................................. G06F 3/00
(52) U.S. Cl. ........................ 345/734; 345/440; 707/100
(58) Field of Search ................................. 345/734, 440, 345/419, 848, 849, 852, 850, 851; 707/100

(56) References Cited

U.S. PATENT DOCUMENTS

| | | | |
|---|---|---|---|
| 5,493,692 A | 2/1996 | Theimer et al. ............ 455/26.1 |
| 5,515,488 A | 5/1996 | Hoppe et al. ................ 345/440 |
| 5,550,559 A | 8/1996 | Isensee et al. ............... 345/684 |
| 5,689,718 A | 11/1997 | Sakurai et al. ............... 707/577 |
| 5,696,915 A | 12/1997 | Johnston, Jr. et al. ....... 345/804 |
| 5,768,578 A * | 6/1998 | Kirk et al. .................... 707/100 |
| 5,777,616 A | 7/1998 | Bates et al. .................. 345/837 |
| 5,777,621 A | 7/1998 | Schneider et al. ........... 345/428 |
| 5,801,747 A * | 9/1998 | Bedard ......................... 725/46 |
| 5,859,639 A | 1/1999 | Ebrahim ...................... 345/788 |
| 5,867,281 A | 2/1999 | Nozoe et al. ................. 345/402 |
| 5,873,089 A | 2/1999 | Regache ....................... 707/100 |
| 5,924,090 A | 7/1999 | Krellenstein ................... 707/5 |
| 5,937,163 A | 8/1999 | Lee et al. ..................... 709/218 |
| 5,991,799 A | 11/1999 | Yen et al. ..................... 709/218 |
| 6,097,393 A | 8/2000 | Prouty, IV et al. .......... 345/419 |
| 6,259,443 B1 | 7/2001 | Williams, Jr. ............... 345/741 |
| 6,271,827 B1 | 8/2001 | Matsumoto .................. 345/601 |
| 6,275,229 B1 | 8/2001 | Weiner et al. ............... 345/440 |
| 6,275,266 B1 | 8/2001 | Morris et al. ................ 348/552 |
| 6,286,141 B1 * | 9/2001 | Browne et al. ............... 725/39 |
| 6,314,415 B1 | 11/2001 | Mukherjee .................... 706/47 |
| 6,373,495 B1 | 4/2002 | Lin et al. ..................... 345/582 |
| 6,417,860 B1 | 7/2002 | Migdal et al. ............... 345/582 |

OTHER PUBLICATIONS

Kirste et al., "A Presentation Model for Mobile Information Visualization," 1996 Comput. & Graphics, vol. 20, No. 5, pp. 669–681.

* cited by examiner

*Primary Examiner*—John Cabeca
*Assistant Examiner*—Kieu D. Vu
(74) *Attorney, Agent, or Firm*—Kevin L. Daffer; Conley Rose P.C.; Leslie A. Van Leeuwen, IBM

(57) ABSTRACT

A method for configuring computer-based information for display includes assigning labels to information units stored in a computer system. The labels are used in grouping the information units. This grouping, performed by a user of the computer system, may result in group arrangements which can be accessed by a display controller associated with the computer system. A method for processing configuration information for display of computer-based information includes receiving input of a group arrangement, and storing the received group arrangement in data structures or rules databases. A method for displaying computer-based information includes detecting an instruction to display an information unit, identifying a group arrangement associated with the information unit, and forwarding the information units within the group to a display device. Data structures or rules databases containing grouping information and/or program instructions executable to carry out the methods may be transmitted over or stored upon a carrier medium.

37 Claims, 5 Drawing Sheets

| | Label (28) | Attribute (30) | Value (32) |
|---|---|---|---|
| 36 { | "grp1name" | keyword group 1 name  50 | "Application A Health Indicators" |
| | "grp2name" | keyword group 2 name  52 | "Disk Capacity Indicators" |
| | "screenpos" | preferred screen position  54 | position indicator, e.g. "left" or "top" |
| 56 { | "priority1" | priority within group 1 | priority indicator, e.g. "2" |
| | "priority2" | priority within group 2 | priority indicator, e.g. "3" |
| | "pointer" | reference/pointer | information unit object handle |

| Label 28 | Attribute 30 | Value 32 |
|---|---|---|
| "grpname" 36 | 34 group name | "Application A Health Indicators" |
| "priority" | 40 priority within group | priority indicator, e.g. "1" or "A" |
| "pointer" | 38 reference/pointer | information unit object handle |

Fig. 2a

| 40 | Attribute 42 | Value 44 |
|---|---|---|
| "sepdisplay" | group elements displayable separately? | answer, e.g., "yes" |
| "pagebrkafter" | reference to last unit before preferred page break | object handle of information unit within group |
| "downldbrkafter" | reference to last unit before preferred download break | object handle of information unit within group |
| "grppriority" | position in group priority sequence | group priority indicator |
| "trigger" | trigger event for display of group | "object B data within warning range" |
| "grppointer" | 46 reference to group | group object handle 48 |

Fig. 2b

|  | Label 28 | Attribute 30 | Value 32 |
|---|---|---|---|
| 36 { | "grp1name" | keyword group 1 name 50 | "Application A Health Indicators" |
|  | "grp2name" | keyword group 2 name 52 | "Disk Capacity Indicators" |
|  | "screenpos" | preferred screen position 54 | position indicator, e.g. "left" or "top" |
| 56 { | "priority1" | priority within group 1 | priority indicator, e.g. "2" |
|  | "priority2" | priority within group 2 | priority indicator, e.g. "3" |
|  | "pointer" | reference/pointer | information unit object handle |

Fig. 2c

|  | application 68 | info. unit 58 | group label 36 |
|---|---|---|---|
| 60 | platform managment | value of system or network quantity | application relating to multiple system or network quantities |
| 62 | web search | web page address | subject keyword or other attribute of information within web page |
| 64 | web page access | portion of web page material | topic connecting multiple web page portions |
| 66 | electronic mail organization | electronic mail message | subject keyword or other message attribute |

Fig. 3

INFORMATION GROUPING CONFIGURATION FOR USE WITH DIVERSE DISPLAY DEVICES

RELATED APPLICATIONS

This application is related to the following copending U.S. Patent Applications, all filed on even date herewith (Nov. 30, 1999): Ser. No. 09/451,948 entitled "Arrangement of Information for Display Into a Continuum Ranging From Closely Related to Distantly Related to a Reference Piece of Information," Ser. No. 09/451,947 entitled "Arrangement of Information for Display Into a Continuum According to Level of Detail," Ser. No. 09/451,949 entitled "Establishment of Information Display Policy for Diverse Display Devices," Ser. No. 09/451,942 entitled "Arrangement of Information Into Linear Form for Display on Diverse Display Devices," Ser. No. 09/451,941 entitled "Arrangement of Information to Allow Three-dimensional Navigation Through Information Displays," Ser. No. 09/451,945 entitled "Navigation Through Displayed Information Using Minimum Display Screen Area," Ser. No. 09/451,944 entitled "Arrangement of Information to Allow Three-dimensional Navigation Through Information Displays with Indication of Intended Starting Point," Ser. No. 09/451,940 entitled "Graphical Display of Path Through Three-dimensional Organization of Information," and Ser. No. 09/451,943 entitled "Method of Using a Graphical User Interface to Configure Information for Display," all by MacPhail.

BACKGROUND OF THE INVENTION

1. Field of the Invention

This invention relates to computer-based information organization, and more particularly to a method of grouping pieces of information together to allow information to be forwarded to diverse displays in a form appropriate to a specific user. The method may be useful for multiple applications involving display of information, including platform management in heterogeneous systems.

2. Description of the Related Art

The following descriptions and examples are not admitted to be prior art by virtue of their inclusion within this section.

Continual advances in software and hardware technology have led to a proliferation of available information-based devices, including computers, telephones, pagers, and personal digital assistants (PDA's). Such devices are increasingly configured with the ability to interact and communicate with one another. For example, electronic mail may currently be sent to some wireless telephones and pagers, and PDA's may be used to access some Internet (also called "World Wide Web" or "web") sites.

Information-based devices such as those described above generally include display screens for presentation of information to the user. The trend in size of these display screens depends on whether the device is fixed or portable. For example, displays associated with desktop computers are generally getting larger, to provide ease of viewing and/or accommodate increasingly complex applications and operating systems. On the other hand, displays associated with portable devices such as wireless telephones and PDA's are small and often getting smaller, to enhance, e.g., portability and battery life. A severe mismatch between the display sizes of two devices communicating with one another may result from these differing trends.

For a situation in which a device, such as a desktop computer, which is normally configured for a large display transmits information to a device having a small display, this mismatch in display size may be particularly troublesome. Because all of the information viewable on the large display will not fit on the small display, a procedure for sending a manageable amount of information to the small display must be used. For example, the information normally shown on the large display may be divided into portions and sent to the small display sequentially, or some of the information may simply be removed from the information sent to the small display.

Both of these procedures may be disadvantageous for the user of the small display. If some of the information normally shown on a large display is not sent to the small display at all, then clearly the user may be denied access to a desired piece of information, and the device having the small display does not provide true access to the information of the large-display device. If the information is instead sent in sequential portions, multiple downloads to the small-display device may be needed before a desired piece of information can be viewed on the small display. Furthermore, pieces of information which are best viewed together may be divided between different portions and shown on the small display at different times.

As an example of interaction between small-display and large-display devices, a system administrator for a computer system or network may connect remotely to a system terminal using a telephone or PDA. The system terminal typically has a large display screen, facilitating rapid access to the values of system or network variables such as transaction rates, application program status, and disk space availability using, for example, a graphical user interface (GUI). If the system administrator contacts the system terminal remotely in response to notification of a problem with the system or network, there is generally a specific set of variables which the system administrator must observe in order to properly diagnose and/or correct the problem. If some or all of these variables are not sent to the small-display device used by the system administrator until after several other pieces of information are sent, valuable time may be wasted. Furthermore, if the variables relevant to the problem at hand are not displayed together on the small-display device, or at least in close succession, obtaining the needed information may be significantly more difficult and time-consuming than when a large display is used.

The difficulty in obtaining the particular pieces of information desired may be increased in situations for which ad hoc information is needed. Ad hoc information refers to information generated or organized in response to a particular event or request, as opposed to static information which is always presented in the same form. Examples of ad hoc information include an alarm message generated in response to a failure detected in a monitored system, as might occur in the system administration application described above, or a list of Internet site addresses (also called Universal Resource Locators, or URL's) provided by a search engine in response to specific search criteria given by a user. Because the content of ad hoc information is by nature unpredictable, the likelihood may be small that a large-display device such as a desktop computer is configured to send the specific desired pieces of information quickly and efficiently to a small-display device in a given situation.

Difficulty in obtaining the desired pieces of information efficiently may also occur, however, in situations for which static information, such as information from a page within an Internet site, is needed. Such difficulty may occur because different users have different preferences as to which pieces of such static information should be obtained first. For example, one user accessing an Internet site established by a city government may be a citizen of the city who is most interested in obtaining links to various city government departments. Another user accessing the same site, on the other hand, may be a potential visitor to the city most interested in obtaining lodging and entertainment information. If both of these users are accessing the site using small-display devices, the computer hosting the Internet site is likely to send the content of the site to the devices in such a way that at least one of these users must wait for multiple information downloads and/or observe multiple screens of unwanted information before obtaining the desired pieces of information.

It would therefore be desirable to develop a method by which the most relevant pieces of information may be efficiently delivered to users of information-based devices having displays of arbitrary size.

SUMMARY OF THE INVENTION

The problems outlined above are in large part addressed by a method of configuring computer-based information for display, including assigning information tags, or labels, to pieces of information, or information units, stored in a computer system. In some embodiments, the labels are assigned by a user of the computer system, while in some embodiments they may be assigned by a developer of the information units, or assigned automatically by, e.g., an application program or operating system. The labels may be used, preferably by a user of the computer system, to set policy for the display of the information units. "Policy" as used herein refers to one or more rules established in advance of a particular situation or event to govern the response of a computer system to that event. In particular, policy governing the way in which information is displayed may be set using a method described herein.

Using labels assigned to information units to set policy for their display may include, for example, using the labels to prioritize the information units and/or group selected information units together. The resulting priority and/or grouping information may be used by a display controller associated with the computer system in determining the order in which information units are sent to a display device. In this way, the information given highest priority by the user may be sent first to the user's display device. Furthermore, information units which are grouped together by the user will be sent to the display device together, if practicable, given constraints such as the display size and the bandwidth of the transmission path between the computer system and the display device. Setting policy for display of the information units may involve setting criteria for other attributes in addition to priority and grouping. As an example, a preferred position on a display screen may be established as part of such policy.

"User of the computer system", as used herein, refers to a person using the computer system primarily for the purpose of obtaining information or exchanging information with another user (though the user may enter some information into the computer system as well), as opposed to a person programming the computer system or developing software for it. The ability of the user to establish policy information is believed to be advantageous by allowing a person using a small-display device (or a display of any size) to receive desired pieces of information from the computer system more efficiently. Because the display controller uses the policy information to send the information units in the way specified by the user to the extent practicable, less time may be spent by the user waiting for the desired information to appear on a small display.

The labels as described herein are a form of "meta-data", or data about data. In particular, a label preferably corresponds to a particular attribute of the data, and the value of that attribute. The label must be linked to the corresponding data (or information unit as described herein). In a preferred embodiment, this linking is implemented by relating the label to a reference or pointer to the information unit, where the relating is done using some sort of data structure. "Data structure" as used herein refers to a collection of pieces of data (which maybe meta-data) and any relationships between the pieces of data. Though a data structure is stored in one or more storage media associated with the computer system, the various pieces of data within a data structure are not necessarily stored in adjacent storage locations within the computer system, and may not all even be stored in the same type of storage medium.

As an example of the method, a system administrator may establish display policies using labels assigned to system and network quantities. The value of such a quantity would be an information unit in such an embodiment. For routine monitoring of system performance, for example, establishing a policy may include establishing a priority sequence which puts highest priority on quantities which are most critical and/or most likely to signal a failure. Other priority sequences could be established for use in the event that a threshold value of a specific variable is exceeded. Grouping of information units using labels is also believed to be useful in the context of system administration. For example, it may be desirable to view values of a group of quantities associated with operation of a particular application program together on the same screen, particularly if a problem with that application program arises. In particular, a system administrator may group data associated with a threshold trigger to other data associated with an application which is known to be affected by the trigger.

If a specified group of information units is too large to fit on a particular display screen, it may be split by the display controller and presented on successive screens, but at least the information in the group may be viewed in relatively rapid succession. In some embodiments, a group too large to fit entirely on a display screen may fit within a buffer of the display device, such that the entire group could at least be downloaded at once. A combination of grouping and prioritizing information units may also be desirable, in which information units within a group are prioritized to be sent to the display in a particular order, and/or multiple groups are prioritized by group.

As another example, a user of an Internet search engine may establish priority sequences and/or groups of Internet site (or page) addresses (the information units, in some embodiments) using labels characterizing subject matter of the corresponding Internet sites. Conventional search engines receive search criteria from a user through entry of keywords, but the ordering of search results presented is generally not under the direct control of the user. The ordering instead depends greatly on the particular ordering algorithm used by a given search engine, and on the degree to which the design of an Internet site is compatible with this algorithm. In an embodiment of the method described herein, each Internet site or page included in a search is assigned one or more labels. These labels may be assigned by the developer of the site, and may take the form of existing labels such as the Meta Keywords Tags included in the hypertext markup language (HTML) often used to create Internet sites. Alternatively or in addition to such an assignment of labels by a site developer, a user of the search engine may assign one or more labels to a site accessed through the search engine, so that the user-assigned labels may be used in future searches. The user of the search engine may enter priority information (e.g. sites with label A should be sent before sites with label B) and/or grouping information (e.g. sites having both labels A and C should be viewed together, if possible) for use by the display controller of the computer system on which the search engine application is running. The display controller establishes an order of Internet site addresses resulting from a search based on the user-entered priority and/or grouping information.

Another example for which user-established grouping of information units may be advantageous is organization of electronic mail messages. In an embodiment of the method, each electronic mail message comprises an information unit. Some of the messages received by a user of an application program for sending and receiving electronic mail are typically retained for future reference. Each of these messages may be assigned one or more labels by the user. A label may be characteristic of the content of the message, or refer, for example, to a particular project or client with which the message is associated. The application program is configured to accept display policy information, such as priority and/or grouping information, for the messages entered by the user, so that the messages may be sent to the display device of the user in an order determined by the user's input. In this way, for example, a user may conveniently review the thread of a particular topic of electronic mail discussion, or view messages pertaining to a particular project or client. Messages within a user-specified group could be prioritized in various user-specified ways, such as chronologically.

In another embodiment of an electronic mail application program, the message labels could be assigned by the sender of the message, instead of or in addition to assignment by the receiver. Such an embodiment may particularly be suitable for a workplace environment, within which a common set of labels could be established (including, e.g., project or client names). In this way, messages would already have labels before being read by the receiver of the message, and a user could set priority and grouping criteria to have incoming messages sent to a display device in a desired order. For example, only those new messages relating to a particularly relevant topic could be downloaded to a remote display device, leaving other messages to be viewed at a later time. Some features of the above-described electronic mail embodiments may be similar to those in existing application such as electronic messaging and news groups, but such existing applications are not believed to allow establishment of display policy by a user, as described herein. Instead, existing systems may typically allow the user to merely select from among preestablished options.

Embodiments of the method described herein may also involve setting display policy relating to multiple types of information units, or information units from multiple types of traditional application program. For example, policy could be set to display one or more documents associated with a particular person along with any incoming electronic mail messages from that person. In some embodiments for which the computer system is linked to a telephone system, computer based information (e.g., documents or electronic mail messages) associated with a particular person could be displayed in response to initiation of a telephone conversation with that person. The methods described herein for setting of display policy may also be used for numerous other applications.

The above examples generally relate to display of ad hoc information, which may present particular display challenges, as noted in the Background of the Invention section above. In particular, ad hoc information units may not yet exist during the time in which policy for display of the information units is being set. For example, a system administrator may wish to set a policy directing that in the event a particular application fails, the rate of a particular transaction during each minute of the five minutes preceding the failure should be displayed. Each of these five transaction rates to be displayed corresponds to an information unit, but these information units do not exist until just prior to the time of the failure.

Setting policy for such information units can therefore not be done by direct assignment of labels to the information units in advance of the existence of the information units. Instead, labels may be assigned, for example, to the type of information unit for which display at a later time is desired, so that display preferences for the type of information unit are established. For example, a particular transaction rate of an application may be a type of information unit, while the value of the rate at a particular time is an actual information unit. In such an embodiment, the policy set by, e.g., the system administrator may describe the particular information units needed for display in response to a particular triggering event, such that the information units may be collected or created when (or if) the event occurs. Labels corresponding to display attributes for the information units may then be assigned directly to the information units when they are collected for forwarding to the display controller.

The method described herein may also beneficially be applied to display of what is generally considered static information, such as the information on a particular page within an Internet site. In an embodiment, the various pieces of information included on the page, or portions of the page material, may be split into information units. This arrangement of the page information into information units may be performed by the developer of the Internet site. Portions of a site which information units might be formed from could include material such as "Contact information", "Products", and "Links to related sites". Display preferences such as priority and/or grouping preferences for portions which may be included on a particular Internet page could then be entered, preferably by a user accessing the web page, using labels corresponding to display attributes. The display controller of the computer system running the browser program may use this preference information in determining the order in which information units are sent to a display device, and/or how the information units are arranged on the screen of the display device. Subject to constraints such as display size and bandwidth, the portions of the page material are sent to the display device in the manner specified. In this way, a user of a small-display device may not need to wait through several download cycles to view a single desired portion of a web page if that portion happens to appear at the bottom of the page. The static information on the web page may be considered as being transformed into ad hoc information, since selected portions of the information are sent to the display in response to user-defined preferences.

In a method contemplated herein for configuring computer-based information for display, a label is assigned to each of multiple information units stored within a computer system. In an embodiment of the method, assignment of labels is accomplished by entering the labels into a data structure relating labels to information units. Alternatively or in addition, labels may be entered into a rules database stored within the computer system. Such a rules database typically includes information which may be used by a control program to create a data structure as described above at such time that display of an information unit is required. The control program may alternatively or additionally use the labels to create a document in a language suited for data transmission, such as Extensible Markup Language (XML). In particular, the labels may be used as tags or sub-tags in such an XML document. In embodiments for which not all information units have been created at the, time the display policy is set, labels are assigned to information units after they are created, in accordance with the preset display policy.

Policy, or criteria, for display of the information units is established using the labels. This display criteria is preferably established by a user of the computer system. In an embodiment of the method the display criteria includes a priority sequence. The priority sequence may be established by entering labels corresponding to a priority attribute and value of this attribute (e.g., a priority indicator such as a number or letter) for each information unit in the sequence. The established display criteria may also include other preferences, such as a preferred position on a display screen of each information unit. In such an embodiment, a label corresponding to a display position attribute and value of this attribute (e.g., a position indicator such as "upper", "center", etc.) is assigned to each information unit.

In some embodiments of the method for configuring computer-based information for display, the information units are arranged into groups. This arrangement into groups is preferably performed by a user of the computer system. The arrangement into groups may be accomplished by assigning a label corresponding to a group attribute and value of this attribute (e.g. a group name). Labels corresponding to group attributes may also be referred to as "group labels" herein. Various display preferences, such as arrangement into groups and prioritizing of information units, may be combined together. For example, information units within groups may be prioritized using labels having a priority attribute as described above along with group labels. The groups themselves may also be prioritized in a similar manner.

In some embodiments, the arrangement of information units into groups may be implemented using an existing protocol such as the Wireless Application Protocol (WAP). In a currently proposed version of the WAP, a web page or other large collection of information or data is broken up into smaller data collections called "decks", wherein the grouping of data within a deck is tighter than the grouping of data on separate decks. The arrangement of information units into groups may additionally or alternatively include specifying preferred "page breaks", or boundaries between which information units are preferably displayed on the same screen of the display device. "Download breaks", or boundaries between which information units are preferably transferred to the display device in a single download, may also be specified. As in the case of all setting of display policy described herein, such specification of page or download breaks is preferably performed by a user of the computer system, at a time prior to the event triggering a display of information.

The information grouping described above may in some embodiments be used to form relatively small groups, or groups having relatively few members, such that a group may be viewed using one (or perhaps a few) screens of a small-display device such as a telephone or PDA. In addition to or instead of such small group formation, however, a group substantially larger than could be displayed on a screen of a small-display device may be formed. In such an embodiment, the group may be considered to comprise an infinite stream of information, which can be sent serially to a small-display device (by setting display policy as described herein). That is, the group is sufficiently large compared to the display capacity of the displaying device that displaying the entire group may involve sequentially displaying portions of an extremely long stream of information. The members of this type of large group, or the information units within the group, are preferably chosen by a user of the computer system, according to a particular interest of the user.

For example, the information in the group could correspond to information contained on a web page of interest to the user. Alternatively, the group could include values over time of a time-varying piece of information, such as a stock price. The order in which the information is arranged for display on a display device may be established by the user by using labels to create a priority sequence, as described above. This type of large, user-defined group may be particularly advantageous in the context of a three-dimensional scheme of information organization and navigation. In such a three-dimensional organization scheme, the information in this large group may be considered to be arranged along an axis in three-dimensional space, such as the x axis. Other related information may be arranged within the three-dimensional space including this axis, with various criteria used to determine the position of each information unit with respect to other axes (e.g. the y and z axes). Organization of information in a three-dimensional scheme, and formation of a means of navigation through this information, may advantageously allow a user to find desired information rapidly and intuitively, even within the constraints of a small display.

The display policy or criteria established as described above is preferably linked to a display controller associated with the computer system, such that information units are sent from the display controller to a display device according to the display criteria. In an embodiment, this linking is accomplished by programming the display controller to access a data structure including display criteria information. Such display criteria information may include priority information, grouping information, position information, or other types of display information. In some embodiments, the linking,is accomplished using a control program executable on the computer system. The control program may create a data structure including display criteria using labels entered into a rules database, and/or create a document such as an XML document, as noted above. Such a data structure and/or document may be sent by the control program to a display controller, from which it may be transmitted to the display device.

In addition to the method described above for configuring computer-based information for display, a method for displaying computer-based information is contemplated herein. An instruction to transmit to a display device a first information unit accessible using a computer system is detected. This instruction may be entered by a user of the computer in some embodiments. Alternatively, the instruction may be generated by a program running on the computer system. Display criteria corresponding to the first information unit are identified. In an embodiment of the method, the display criteria includes a priority sequence, where the priority sequence links or relates multiple information units including the first information unit. This identification may be performed by accessing a data structure and/or rules database containing priority sequence information for the multiple information units. The multiple information units may then be forwarded to the display device in an order determined from the priority sequence.

In some embodiments, the identified display criteria includes a group, wherein the group links multiple information units including the first information unit. As in the case of the priority sequence identification described above, the identification of a group may be performed by accessing a data structure and/or rules database containing group arrangement information for the multiple information units. The multiple information units within the group are then preferably forwarded to the display device before forwarding of other information units. In this way, the user may efficiently view information associated with the first information unit. Both group information and priority information may be used by the display controller when forwarding the information to the display device, and the grouping and priority information may be contained within the same data structure. The display criteria may include other information instead of or in addition to grouping or priority information, such as a preferred position on the display screen for the requested information unit.

In addition to the methods described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless transmission path along which the program instructions are transmitted, or a signal carrying the program instructions along such a wire, cable or wireless transmission path. In an embodiment, the carrier medium contains program instructions executable on a computer system for receiving entry from a user of the computer system of display criteria, such as a priority sequence and/or a grouping arrangement, for information units stored within the computer system. Receiving entry of display criteria preferably includes receiving entry of labels corresponding to the information units. The labels may be entered by a user of the computer system, or established by the creator of the information units, depending on the application associated with the program instructions. The labels establishing the display criteria may be stored in one or more data structures relating the display criteria to the corresponding information units. In embodiments for which both a priority sequence and a grouping arrangement are received, the priority and grouping information may be stored in the same data structure. In an embodiment for which multiple groups are established and the groups are prioritized, such a data structure may also include group priority information. The program instructions may be further executable for forwarding the information units to a display device in a manner determined using the display criteria.

In addition to the carrier medium described above, a carrier medium containing program instructions executable for implementing the above-described method for displaying computer-based information is contemplated herein. A carrier medium containing a data structure is further contemplated herein. The data structure relates information units stored within the computer system to labels assigned to each of the information units, wherein the labels may be part of user-established display criteria, such as a priority sequence of the information units or grouping arrangement of the information units. In one embodiment, for example, a data structure may correspond to attributes of an object within an object-oriented programming approach, wherein the object is the information unit, and a label corresponding to each attribute is tied to, or associated with, the object using an object handle which references the object. A carrier medium containing a rules database is also contemplated herein, where the rules database contains display criteria for information units stored within the computer system. The display criteria is preferably established by a user, and may include labels corresponding to display-related attributes of the information units.

BRIEF DESCRIPTION OF THE DRAWINGS

Other objects and advantages of the invention will become apparent upon reading the following detailed description and upon reference to the accompanying drawings in which:

FIG. 2 illustrates the content of exemplary data structures which may be included on a carrier medium associated with the computer system of FIG. 1;

FIG. 3 illustrates exemplary information units and labels which may be employed in specific applications of the methods described herein;

Figure 1:
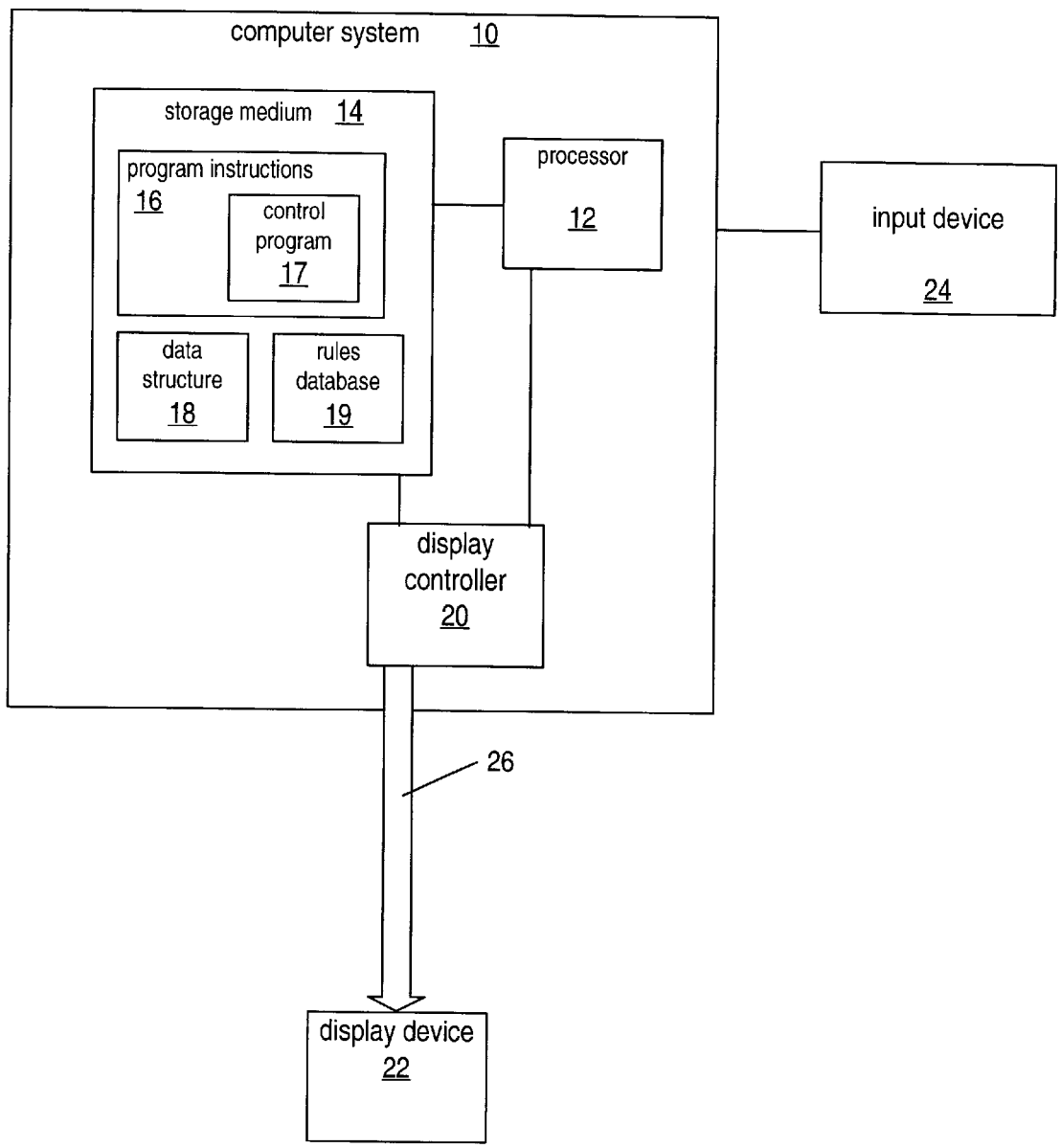
FIG. 1 is a block diagram illustrating an embodiment of a computer system and display device which may be used to implement the methods described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A block diagram illustrating an exemplary embodiment of a computer system which may be used to implement the methods described herein is shown in FIG. 1. Computer system 10 includes processor 12, which is coupled to storage medium 14 and display controller 20. Storage medium 14 may take many forms, such as volatile or nonvolatile memory, a magnetic disk such as a hard drive or floppy disk, an optical disk, and/or a magnetic tape. Storage medium 14 may include program instructions 16, data structure 18, and/or rules database 19, described in more detail below. Display controller 20 configures data for display on a display device such as display device 22, and may provide an interface between computer system 10 and display device 22. Display device 22 is preferably a display screen, and may be formed within various devices, such as a monitor, laptop computer, telephone, pager or PDA. Such a display screen may be formed using various technologies, including liquid crystal display (LCD) technology, cathode ray tube (CRT) technology or projection technologies. Furthermore, display device 22 may be a display screen having one of many different sizes. Display controller 20 is adapted to send an appropriate amount of data to display device 22, an amount which may vary depending on the size of the display.

In the embodiment of FIG. 1, data structure 18 is a collection of interrelated data stored in storage medium 14. As described further below in connection with FIG. 2, data structure 18 may include multiple pieces of data (and/or metadata) and the relationships between the pieces of data.

In particular, data describing display-related attributes of information units accessible using computer system 10 may be included in data structure 18. "Accessible using a computer system" or "accessible by a computer system" as used herein refers to information units which may be found stored on the computer system or a network associated with the system, or created using the computer system. The display-related attributes may additionally or alternatively be stored within rules database 19. In the embodiment of FIG. 1, rules database 19 is a database in which rules are stored which define policy for the display of information units stored in the computer system. An example of such a rule could be: "if application B fails, display available space on disk A," or "available space on disk C should be displayed in the upper right corner of the screen." Rules database 19 may be accessed by control program 17, which monitors and detects events which may trigger a display of information units. Such an event might be, for example, a message from an application program or operating system of a failure, or an instruction from a user to display a particular piece of information. When a display of information units is indicated, control program 17 may access the rules database to determine the rules applicable to the particular information unit being displayed, and collect the information needed by display controller 20 to display according to the pre-established policy. Such information may include the information unit itself in some embodiments. This collecting of information may involve the creation of one or more, data structures similar to data structure 18, which may be forwarded to display controller 20 so that the appropriate information units may be sent to display device 22. Such formation of data structures and/or information units dynamically at such time as they are needed is believed to advantageously allow display policy to be predetermined for even ad-hoc information, which may not exist prior to the time at which its display is required.

As used in the methods described herein, display controller 20 may be linked to storage medium 14. This linkage allows display controller 20 to take into account display policy information which may be included on storage medium 14 when configuring data to forward to display device 22. Display controller 20 and display device 22 are connected by carrier medium 26, in this case a transmission medium. Carrier medium 26 may therefore include a wire, cable, or wireless transmission path, or a signal traveling along such a wire, cable or wireless path. In embodiments for which display device 22 is remotely located with respect to computer system 10, carrier medium 26 may contain both "wired" and wireless portions. Computer system 10 may be connected to at least one input device 24 through which a user may enter information into the computer. Input device 24 may be a device used for manual entry of information, such as a keyboard or pointing device, or a device such as a disk drive or tape drive for receiving stored information. In some embodiments, a user may also input information using the device associated with display screen 22, using a transmission medium similar to carrier medium 26.

It is noted that a computer system suitable for the methods described herein may include other components not explicitly shown. For example, other input/output devices and/or interfaces may be included. Furthermore, in the block diagram of FIG. 1 the blocks are intended to represent functionality rather than specific structure. Implementation of the represented system using circuitry and/or software could involve combination of multiple blocks into a single circuit or program, or combination of multiple circuits or programs to realize the function of a block. For example, storage medium 14 may include memory associated with various elements, including processor 12 and display controller 20. Furthermore, the elements within computer system 10 may be related using various levels of integration. For example, storage medium 14, processor 12, and display controller 20 may be integrated onto a single board or a single chip, or, alternatively, may not be within the same case. Storage medium 14, for example, may be external to the case of computer system 10, particularly in embodiments for which it is a disk or tape.

Exemplary embodiments of contents of data structure 18 are illustrated in FIG. 2. The table of FIG. 2a includes data which may be included in a data structure corresponding to a particular information unit. Such a data structure may be employed, for example, when an object-oriented approach is used to implement the methods described herein. In such an approach, each information unit may be considered an "object". The data of FIG. 2a may be used to define attributes of such an object. In the embodiment of FIG. 2a, each of the labels 28 assigned to an information unit corresponds to an attribute 30 and a value 32 of that attribute. For example, the value of group name attribute 34 is "Application A Health Indicators" in the embodiment of FIG. 2a. (Quotation marks are used in FIG. 2 to denote actual exemplary values, while entries not in quotation marks are descriptions of a suitable value.) Label 36, which may also be called a "group label" as used herein, corresponds to group name attribute 34 and is used to include the information unit described by the data structure in the "Application A Health Indicators" group. The information unit described by, e.g., attributes 34 and 40 is referenced using the label corresponding to reference/pointer attribute 38, where the value of reference attribute 38 is the object handle of the information unit.

An object handle as used in an object-oriented programming approach may be considered a name (typically an alphanumeric character, word, or phrase) used to reference the object. Operations performed with respect to the object are described by a programmer in terms of the object handle. The object handle is associated with the actual, object using, e.g., some sort of data structure. The object handle may be stored in a completely different storage location than that used to store the actual object, however. As noted above, the table of FIG. 2a includes information in a data structure associated with an information unit within the group "Application A Health Indicators". Other information units may be included within this group by including group label 36 in other data structures similar to that illustrated by FIG. 2a, where the other data structures correspond to and reference these other information units. In the embodiment of FIG. 2a, priority information for the information unit is also specified using a label corresponding to priority attribute 40. Priority attribute 40 describes the position of the information unit referenced in a priority sequence of the information units within the group to which the information units are assigned. The value of priority attribute 40 is a priority indicator, such as a priority number or another indicator which is easily sequenced (e.g., a letter).

Attributes of a group, such as that established using group label 36 in FIG. 2a, may be defined in some embodiments using a data structure referencing the group, as shown in FIG. 2b. In the embodiment of FIG. 2b, each of labels 40 assigned to the group corresponds to an attribute 42 with a value 44. Attributes used to characterize the group of FIG. 2b may include, for example, an indication of whether the group's information units may be displayed separately, a position of the group within a group priority sequence, a reference to the last information unit within the group to be displayed before a page or download break, and a trigger event which must occur before the information units within the group are displayed. Reference attribute 46 is used to connect the data structure to the information group, using information group object handle 48.

In some embodiments, both page and download breaks may be specified at the same positions within a priority sequence, thereby establishing a group of information units which are preferably downloaded to a display device together and viewed together on the same display screen. In such an embodiment, if the display controller is unable to fit all of the grouped information units together on the display screen, the units may still fit into a single download to the display device. The units in the group which do not fit on the first displayed screen may then be held in a display buffer associated with the display device. In other embodiments, particularly if the sizes of the information units and capacities of the display screen and display buffer are known, page breaks and download breaks may be specified at different locations within the display sequence. Priority sequences used in specifying page and download breaks may include individual priority sequences, group priority sequences, or sequences formed by, for example, concatenating lists of information units forming each established group, with the groups arranged in an order specified by a group priority sequence.

In some embodiments of the method, multiple levels of labels may be used. For example, one label could be used to characterize a general priority of an information unit or group, such as "high," "medium" or "low," while another may be used for a more specific priority indicator. Furthermore, a single label may be used to refer to the entire set of attributes and values assigned to an information unit or group. For example, a single label could be established to refer to the information associated with all of labels 28 in FIG. 2a, or labels 40 in FIG. 2b. In an embodiment for which the data of FIG. 2a or 2b is sent to the display controller using an XML document, such a single label may be used as an XML tag, while labels 28 or 40 may be used as sub-tags.

An additional example of the content of a data structure for an information unit is shown in FIG. 2c. As shown by the embodiment of FIG. 2c, multiple group labels 36 may be assigned to an information unit. For example, group 1 name attribute 50 may have the value "Application A Health Indicators," while group 2 name attribute 52 may have the value "Disk Space Availability Indicators." The information unit referenced by the data structure might in this case represent the space available on a particular disk which is accessed by application A. Display of the information unit may therefore be desirable both in the context of monitoring the health of application A, and for overall monitoring of disk space in the computer system. Membership of an information unit in multiple groups may also be advantageous for many other applications, such as arranging web pages into groups characterizing subject matter on the web page. In the embodiment of FIG. 2c, the information unit is also characterized by, a priority within each of the two groups to which is belongs. Priority labels 56 may be used to assign the information unit to, for example, position "2" in group 1, and position "3" in group 2. Other display-related attributes which may be included in a data structure include preferred screen position attribute 54, having a position indicator as its value.

The data structures of FIG. 2 are merely exemplary, and these data structures, as well as all data structures described herein, may be implemented in various configurations. For example, attributes of more than one information unit or group could be combined in one data structure in some embodiments, or group attributes and information unit attributes could be combined in one data structure. Alternatively or in addition to the object-oriented approach suggested by the examples of FIG. 2, other data structure forms may be used. For example, a look-up table including multiple information units and the associated display criteria labels could be formed.

The illustrations shown in FIG. 2 of exemplary data structures include relationships between quantities including information units and group labels without including information as to the specific nature of these quantities. The nature of an information unit or label may vary depending upon the application in which these quantities are being used. Examples of such applications are shown in the table of FIG. 3, along with descriptions of information units 58 and group labels 36 which may be appropriate for the applications.

In platform management application 60, for example, the user of the computer system is typically a system administrator for the system or a network including the system. "Platform management" generally refers to ensuring the effective operation of application programs, systems, or networks on one or more "platforms", where a platform refers to a specific hardware configuration and/or operating system. Platform management may be particularly challenging in systems or networks including multiple heterogeneous platforms. Such systems may also be referred to by other terms, such as "multiple heterogeneous systems," and management of them may also be called, for example, "cross-platform management." Platform management of a multiple heterogeneous system may often involve remote management of at least some parts of the system, and failure detection and reporting become increasingly important with increased system complexity.

By facilitating transfer of information from a computer system within such a heterogeneous system to a display device which may be remotely located with respect to the system, the methods described herein are believed to provide advantages in platform management application 60. As shown in FIG. 3, information units 58 which may be appropriate for this application include values of system or network quantities. These quantities may include, for example, transaction rates, available network capacity, and/or available disk space for a given application. Group labels 36 which could be assigned for platform management application 52 may characterize, for example, an application program having performance associated with multiple system or network variables. The labels corresponding to these variables could be grouped together using a group label, so that the system administrator could monitor the variables corresponding to this application program by having the group of information units sent to a display device.

Web page search application 62 is another example illustrated in FIG. 3. Information units 58 which may be appropriate for this application include Internet addresses of pages found by the search. Group labels 36 could represent subject matter keywords or other attributes shared by multiple web pages. Such subject matter keywords could in some embodiments be implemented using existing designations, such as HTML Meta Keywords Tags, which are used by some search engines in prioritizing search results. The web sites corresponding to particular keywords could be grouped together using a group label, and a priority sequence could be established for groups so formed. In this way, the order of sites presented as the result of a search could be controlled by a user of the web search application.

Web page access (or web browser) application 64 is further illustrated in FIG. 3. Information units 58 which may be useful for this application include portions of the material displayed on the web page. The splitting of the web page material into information units may be done by the developer of the web page. In an embodiment, this establishment of information units could be implemented by creating an object comprising each information unit. Grouping of the information units could be established by the user, particularly in the case of web pages for which frequent access is anticipated. Group labels 36 may characterize a subject or purpose connecting more than one of the web page portions, as shown in FIG. 3. For example, a group including information units describing a particular product, pricing information for the product, and ordering information for the product could be formed.

An additional application illustrated in FIG. 3 is electronic mail organization application 66. For this application, information units 58 may be electronic mail messages. A group label 36 may be assigned to each of a set of the information units, where group label 36 represents a subject keyword or some other attribute common to the messages within the group. Group labels, 36 may, for example, characterize subjects discussed, project names, or client names related to the messages.

As at least partially illustrated by the examples of FIG. 3, the content and length of information units and group labels may vary significantly depending on the application for which information is configured for display. An information unit, for example, may include a number representing a quantity such as available disk space, an alphanumeric Internet site address, alphanumeric words and/or phrases displayed on a web page, or an entire electronic mail message. Priority indicators, as discussed above, preferably include numbers, but may also include other indices which are conveniently sequenced, such as letters. As in the case of other figures presented herein, FIG. 3 illustrates only exemplary embodiments. The methods described herein may be used for applications other than applications 68 shown in FIG. 3, and applications 68 may also be implemented in ways other than those illustrated by FIG. 3.

Figure 4:
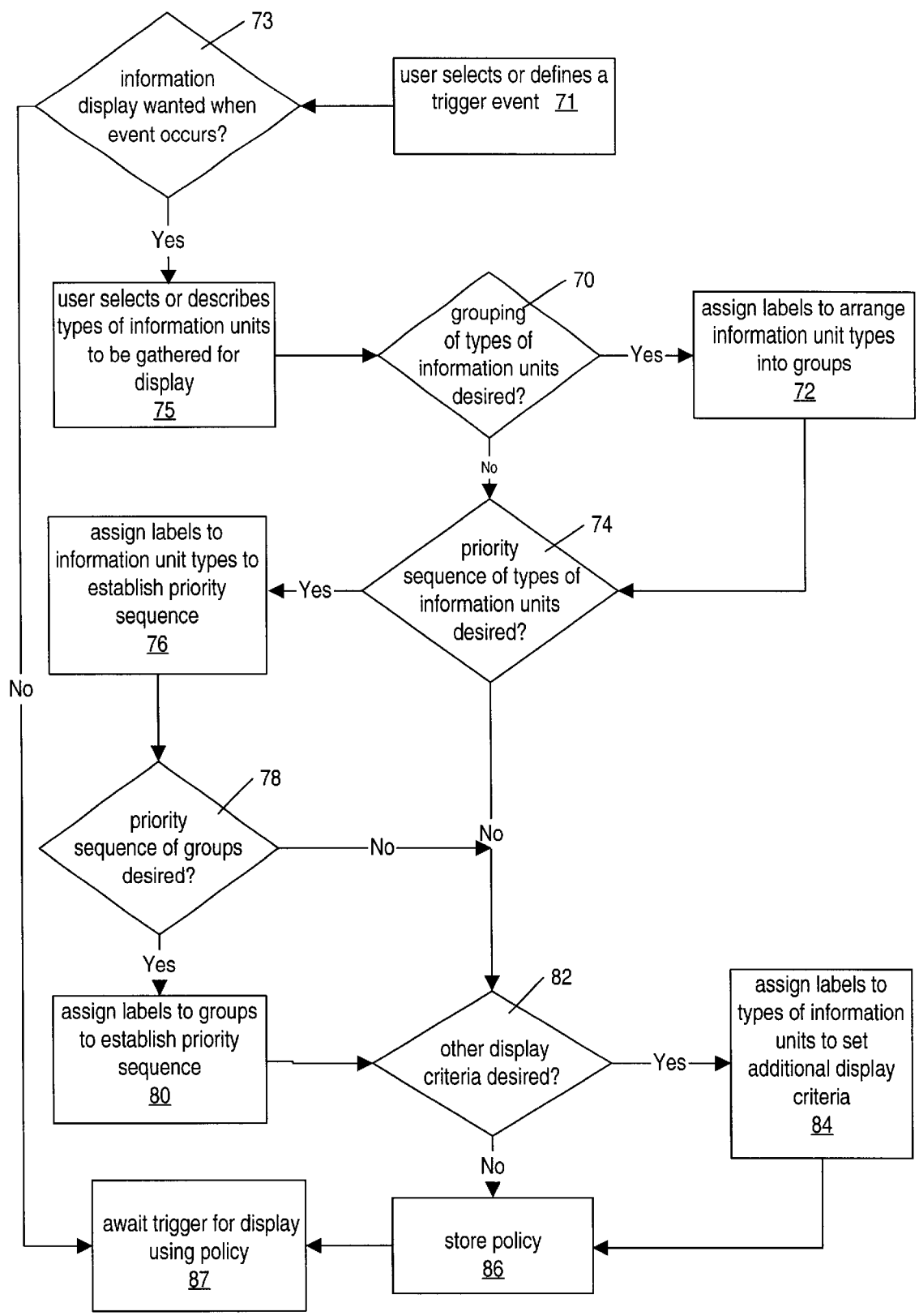
FIG. 4 is a flow diagram illustrating a method of setting policy for display of computer-based information.

Turning now to FIG. 4, a flow diagram illustrating a method of configuring information units stored in a computer system for display, or setting policy for display of the information units, is shown. The information units are typically stored using a storage medium such as storage medium 14 of FIG. 1, and may be within a data structure such as data structure 18 of FIG. 1. In some embodiments, storage of the information units is not done until they are created and/or collected for forwarding to the display controller. In the embodiment of FIG. 4, a trigger event is defined by the user (box 71). If display of information in response to this trigger event is desired (decision box 73), the user selects or describes the types of information units to be gathered for display (box 75). The selection of a trigger event and types of information units is part of the policy being set, and may be entered into, for example, a rules database.

Labels are assigned to arrange the information unit types into groups (box 72), if grouping of information units is desired (decision box 70). This assignment of labels preferably involves entering the labels into a data structure and/or a rules database relating the labels to the types of information units, where the labels are similar to group labels 36 of FIGS. 2 and 3. The assignor of the labels may vary depending on the application for which the information units are being displayed. In some embodiments of the method of FIG. 4, arrangement of labels into groups is performed by user of the computer system. This is advantageous in allowing the user to specify which information units are preferably displayed together. In some embodiments, on the other hand, groups are established by a developer of the information units. For example, subject matter keywords describing an Internet site, which may also be used as group labels, may be assigned by the developer of the site. Arranging of labels into groups may in some cases be done automatically according to an algorithm within, e.g., an application program or operating system. In a preferred embodiment, such automatically assigned labels may be established as "default" labels which may be subsequently changed by a user of the computer system.

Labels may also be assigned to establish a priority sequence for the information unit types, as indicated by box 76 of FIG. 4, if such a priority sequence is desired (decision box 74). This assignment of labels preferably includes entering the labels into a data structure and/or rules database relating the, assigned labels to the types of information units, where the labels are similar to, e.g., priority label 40 of FIG. 2a. In addition to the assignment of priority labels to information unit types as in box 76, a group priority sequence may be established, if desired (decision box 78), by assigning priority labels to groups of information units, as indicated in box 80. The individual and/or group priority sequences are preferably established by a user of the computer system, but priority labels may also be assigned, either automatically or by a developer of the information units. If establishment of other display criteria is desired (decision box 82), labels corresponding to such criteria may be assigned, as indicated in box 84 of FIG. 4. For example, a label corresponding to a preferred screen position attribute such as attribute 54 of FIG. 2c could be assigned.

The display policy including the display criteria information established as described in boxes 70 through 84 of FIG. 4 is stored (box 86), if not stored previously during the method of FIG. 4. The policy may be stored in, for example, a rules database similar to database 19 of FIG. 1, and/or in one or more data structures similar to data structure 18 of FIG. 1. This storage of the display criteria serves to link the display criteria to a display controller, such as controller 20 of FIG. 1. In an embodiment of the method of FIG. 4, a control program similar to control program 17 of FIG. 1 uses rules within a rules database to collect the information needed for a display of information. The display of information may be in response, for example, to an event detected by the control program. The control program may create one or more data structures with the collected information. In some embodiments, data structures such as those of FIG. 2 are not created until such time as a display of the corresponding information units is needed. This may occur particularly in the case of ad-hoc information. After the policy is stored, a trigger event for a display is awaited (box 87).

The link described above between the display controller and the display preferences embodied in the policy stored during the method of FIG. 4 allows the display controller to take these preferences into account when configuring data to be forwarded to a display device. Performing the method of FIG. 4 may involve use of a configuration or "setup" routine associated with, e.g., an application program or operating system. Such a configuration or setup routine may employ a GUI using, e.g., icons to represent information units, labels and/or attributes. In this way, an intuitive manner of establishing a display policy may be provided, and the establisher may not need to directly access entities such as a data structure or rules database. It is noted that for embodiments for which policy is set for display of static information, the label assignments in FIG. 4 could be made for information units themselves instead of or in addition to types of information units.

Figure 5:
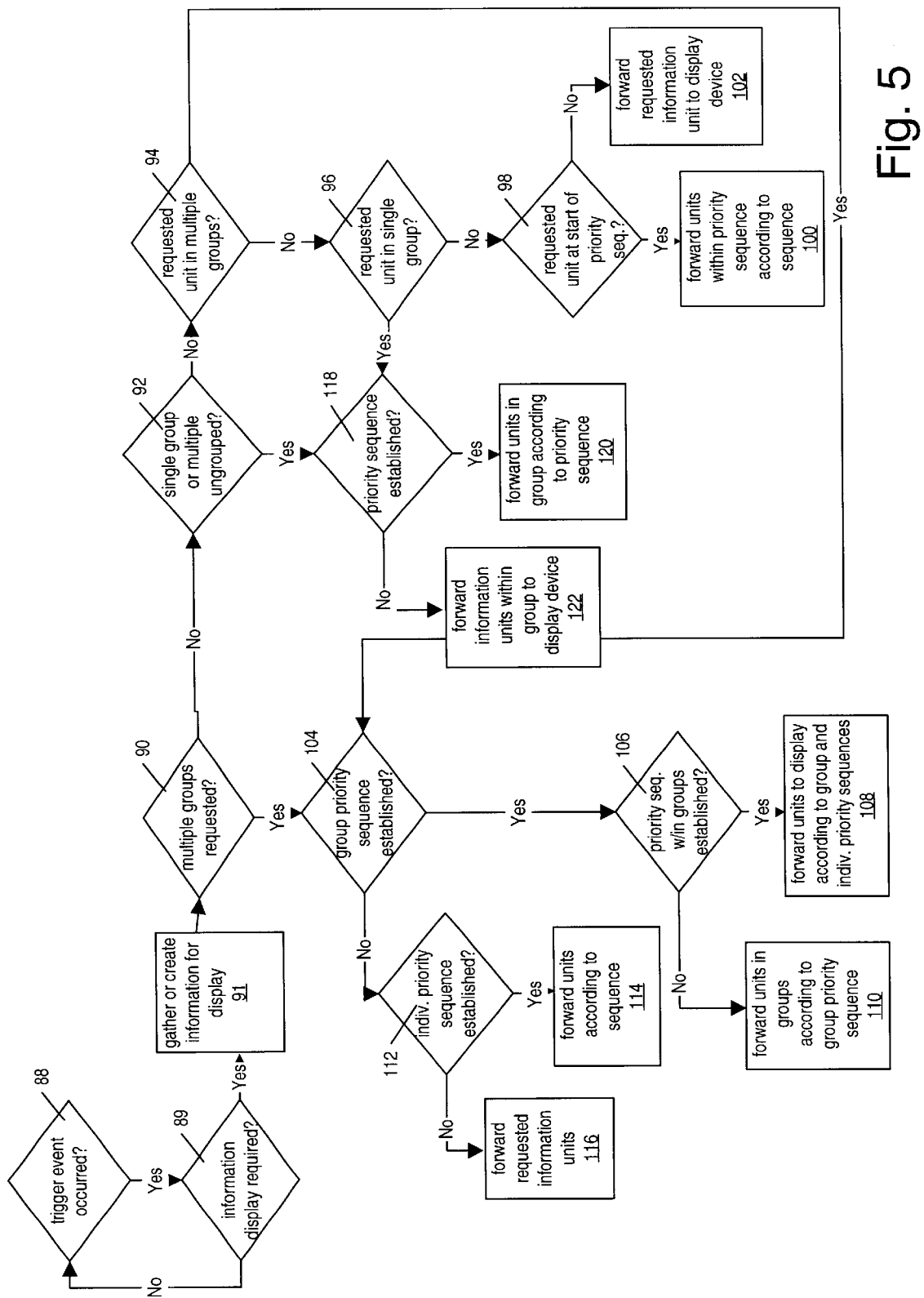
FIG. 5 is a flow diagram illustrating a method of displaying computer-based information.

An embodiment of a method for displaying information units stored in a computer system is illustrated by the flow diagram of FIG. 5. The method of FIG. 5 is typically performed by the processor and/or display controller of the computer system, and may be performed subsequent to configuration of display preferences for information units by a method such as that of FIG. 4. In the embodiment of FIG. 5, if a trigger event requiring a display of information is detected (decision boxes 88 and 89), information for display is gathered or created (box 91). Detection of the triggering event and gathering/creating information may be performed by a control program such as program 17 of FIG. 1. The trigger event may be an instruction entered by a user of the computer system, or may be generated by a program such as an application program or operating system running on the computer system. The policy established to respond to the trigger event may direct forwarding of various numbers of information units, including single units, a group of units, or multiple groups of units.

After detection of the trigger event, it is determined whether multiple groups of information units are requested by the instruction (decision box 90). If multiple groups are not requested, it is determined whether a single group of information units, or a set of multiple ungrouped information units, is requested (decision box 92). If a single group or set of multiple units is not requested, it is determined that a single information unit was requested by the instruction. In the case of such an instruction to forward a single information unit, it is then determined whether the requested information unit is part of one or more established groups or priority sequences. In the embodiment of FIG. 5, determination of whether an information unit is associated with a group or priority sequence is preferably accomplished by accessing one or more data structures or rules databases in which priority and/or group arrangement information may be stored. If an information unit is part of a group or priority sequence, other information units which are grouped with or arranged in a priority sequence with the requested information unit may be sent to the display device along with the requested unit, in order to allow convenient viewing of such related information along with the requested information unit. In some embodiments, the display controller may be configured to end transmission of such additional information units if an appropriate signal is received from the user of the computer system (for cases, for example, in which viewing of such related information units is not desired by the user).

In the embodiment of FIG. 5, decision boxes 94, 96, and 98 illustrate a determination of whether a single requested information unit is associated with multiple groups, a single group, or a priority sequence. In the embodiment of FIG. 5, it is particularly determined whether a priority sequence starting with the requested information unit has been established (box 98). If no group or priority sequence is associated in this manner with the information unit, the information unit alone is forwarded to the display device (box 102). If a priority sequence starting with the requested unit has been established, on the other hand, the units within this priority sequence are forwarded to the display device (box 100). Actions taken when a group on information units is requested, or when a requested information unit is associated with a group or priority sequence are described in more detail below.

If multiple groups of information units are requested ("yes" branch of decision box 90 in FIG. 5), it is determined whether a group priority sequence has been established for the groups (decision box 104). If so, and if a priority sequence for information units within the groups has been established (decision box 106), the information units are forwarded to the display device in an order determined by the group and individual priority sequences (box 108). The number of information units sent to and/or appearing on the display device at one time is generally dependent on other factors as well, such as display size and bandwidth of the transmission medium. Alternatively, if a group priority sequence has been established, but there is no priority sequence for information units within the groups, the information units are forwarded in groups to the display device (box 110). In such an embodiment, and other embodiments for which one or more priority sequences are not specified, the order in which information units within a group are forwarded to the display device may be determined by the display controller in various ways, such as by sending the information units in the order in which they are listed within a data structure.

If multiple groups of information units are requested, and no group priority sequence is established ("no" branch of decision box 104), it is determined whether an individual priority sequence has been established for the requested information units (decision box 112). If so, the information units may be forwarded to the display device in an order determined using the individual priority sequence (box 114). If no individual priority sequence is available, the requested information units may be sent to the display device in an order determined by the display controller using other considerations, as discussed above (box 116). If the instruction to send information units to the display device refers to the information units by group, the order in which the information units are sent to the display device preferably involves sending grouped information units together, even when no group priority sequence has been established.

Moving to decision box 92 of FIG. 5, if a single group of information units or a set of multiple ungrouped information units is requested in the detected instruction, it is determined whether a priority sequence for the requested information units has been established (decision box 118). If so, the information units are forwarded to the display device according to this priority sequence (box 120). If no priority sequence is available, on the other hand, the information units are sent to the display device in an order determined by the display controller (box 122). If a single information unit is requested in the detected instruction, and this information unit is included in multiple established groups ("yes" branch of decision box 94), a similar procedure may be followed as for the case of an instruction requesting multiple groups of information units. In the embodiment of FIG. 5, therefore, related information grouped with the requested information unit is sent to the display device along with the requested information unit. If a single requested information unit is instead included within a single established group ("yes" branch of decision box 96), a similar procedure may be followed as for the case of an instruction requesting a single group or multiple ungrouped instruction units.

The method illustrated by the flow chart of FIG. 5 is merely an exemplary embodiment, and other methods of displaying information units by taking into account display preferences such as grouping arrangements or priority sequences may be used. For example, other established display criteria may be considered, in addition to grouping and priority sequences. Furthermore, related information units (through, e.g., a group or priority sequence) could be identified for each of a set of multiple ungrouped information units for which forwarding to the display device is requested. In other words, a procedure similar to that of boxes 94 through 102 in FIG. 5 could be followed not just for single requested information units, but for each of a set of multiple information units. In other embodiments, on the other hand, related information units may not be sent to the display device along with a requested information unit, unless a specific instruction from the user to do so is received (possibly in response to a query).

A method of processing configuration information for display of computer-based information is also contemplated herein. Such a method may be performed by a processor in a computer system, such as processor 12 of FIG. 1. In an embodiment, the method begins with receiving entry of policy for display of information units accessible using the computer system. The policy may include labels corresponding to types of information units, or in some cases to information units themselves. Each label preferably corresponds to an attribute related to display of the corresponding information unit or type, and a value of the attribute. Such attributes may include group name attributes, priority attributes, page or download break attributes, and/or other display-related attributes such as preferred position of an information unit within a display screen. The received labels may then be stored in a data structure and/or rules database relating the labels to the information units. The data structure is preferably similar to data structure 18 of FIG. 1, the rules database similar to database 19 of FIG. 1, the labels similar to labels 28 and 40 of FIG. 2, and the information units similar to information units 58 of FIG. 3.

Program instructions implementing methods such as those described above may be transmitted over or stored on a carrier medium. The carrier medium may be a transmission medium such as a wire, cable, or wireless transmission link, or a signal traveling along such a wire, cable or link. Transmission medium 26 of FIG. 1 is an example of such a transmission medium. The carrier medium may also be a storage medium, such as a read-only memory, a random access memory, a magnetic or optical disk, or a magnetic tape, similar to storage medium 14 of FIG. 1. One or more data structures and/or rules databases may similarly be transmitted over or stored upon such a carrier medium.

It will be appreciated by those skilled in the art having the benefit of this disclosure that this invention is believed to provide methods for configuring information units stored in a computer system for display on a display device having arbitrary size. Furthermore, it is also to be understood that the form of the invention shown and described is to be taken as exemplary, presently preferred embodiments. Various modifications and changes may be made without departing from the spirit and scope of the invention as set forth in the claims. For example, although the methods described herein are believed to be advantageous for transfer of information from a computer system having a large display to an information-based device having a small display, the methods may be used for data transfer between devices having any relative display size relationship. Furthermore, the system and methods described herein may be implemented using many combinations of hardware and/or software, and at one or more of many different levels of hardware and/or software, as is the case with many computer-based applications. It is intended that the following claims be interpreted to embrace all such modifications and changes.

What is claimed is:

1. A method of configuring display information, comprising:

arranging multiple information units stored within a computer system into groups by assigning a label to each of the multiple information units; and linking a resulting group of information units together and sending the group of information units to a display controller associated with the computer system, such that the display controller is adapted to send at least a subset of the group of information units together, at substantially the same time, to a display device in accordance with the group arrangement, and further in accordance with a size of the group compared to a screen capacity of the display device.

2. The method as recited in claim 1, wherein said arranging comprises forming a group having a size substantially larger than the screen capacity of the display device.

3. The method as recited in claim 1, wherein said arranging comprises setting a policy for said assigning a label to each of the multiple information units, wherein the policy is adapted for at least one of the multiple information units to be created after said setting a policy.

4. The method as recited in claim 3, wherein said setting a policy comprises entering rules into a rules database, wherein said rules characterize collection of the at least one of the multiple information units in response to an instruction for display of the at least one information unit, and wherein said rules are adapted for the instruction for display to occur after said entering rules.

5. The method as recited in claim 1, wherein said computer system is adapted such that said arranging multiple information units may be performed by a user of the computer system.

6. The method as recited in claim 1, wherein said assigning a label comprises entering the label into a data structure that relates labels to information units.

7. The method as recited in claim 6, wherein the data structure comprises the label and a reference or pointer to a corresponding information unit.

8. The method as recited in claim 7, wherein the corresponding information unit comprises an object, and the reference or pointer comprises an object handle.

9. The method as recited in claim 1, wherein said assigning a label comprises entering the label into a rules database that relates labels to information units.

10. The method as recited in claim 1, wherein said assigning a label comprises describing an attribute of a corresponding information unit and a value of the attribute.

11. The method as recited in claim 1, wherein said assigning a label comprises assigning an identical label to each of a set of information units within the multiple information units, such that a group comprising the information units within the set is formed.

12. The method as recited in claim 11, wherein multiple groups are formed by assigning multiple labels to respective multiple sets of information units, further comprising establishing a priority sequence of the groups.

13. The method as recited in claim 12, wherein said establishing a priority sequence comprises assigning an additional label to each information unit, wherein the additional label comprises a group priority indicator.

14. The method as recited in claim 1, wherein said arranging comprises arranging the information units into Wireless Application Protocol decks.

15. The method as recited in claim 1, wherein said arranging comprises specifying page breaks and download breaks to be taken into account by the display controller when sending information units to the display device.

16. The method as recited in claim 1, wherein said computer system is adapted such that said arranging may be performed by a system administrator for the computer system.

17. The method as recited in claim 16, wherein said arranging comprises arranging information units comprising values of system or network quantities.

18. The method as recited in claim 17, wherein said system or network quantities comprise a transaction rate or an amount of available disk space.

19. The method as recited in claim 1, wherein said linking the resulting group arrangement comprises programming the display controller to access a data structure comprising the group arrangement.

20. The method as recited in claim 1, wherein said linking the resulting group arrangement comprises configuring a control program to access a rules database comprising the group arrangement and forward the group arrangement to the display controller.

21. A method of displaying information, comprising:
collecting multiple information units into a group of information units using a policy;
detecting an instruction to transmit to a display device a first information unit stored within a computer system;
identifying the group of information units as corresponding to the first information unit, wherein the group links multiple information units including the first information unit; and
forwarding the group of information units together to the display device depending on the size of the group compared to the screen capacity of the display device before forwarding other information units.

22. The method as recited in claim 21, wherein said detecting an instruction comprises detecting an alarm instruction generated by a program executable on the computer system to monitor a value of a quantity represented by the first information unit.

23. The method as recited in claim 21, wherein said detecting an instruction comprises detecting an instruction entered by a user of the computer system.

24. The method as recited in claim 21, wherein said identifying comprises accessing a data structure containing group arrangement information for the multiple information units.

25. The method as recited in claim 21, wherein said identifying comprises accessing a rules database containing group arrangement information for the multiple information units.

26. The method as recited in claim 21, wherein said forwarding comprises forwarding to a display device remotely located with respect to the computer system.

27. A computer-usable carrier medium, comprising program instructions executable on a computer system to enable a user of the computer system to enter a policy for forming a grouping arrangement of information units of which at least a portion of the grouping arrangement of information units are sized to fit upon a display device and are accessible by the computer system, wherein said policy determines which of the grouping arrangement of information units to include within the portion and which of the grouping arrangement of information units excluding the portion are sized to fit upon the display device after said display device displays said portion.

28. The carrier medium as recited in claim 27, wherein:
the program instructions form a portion of an application program for monitoring the status and operation of the computer system;
the information units comprise values of system or network quantities; and
a group of information units comprises values of related system or network quantities to be displayed together.

29. The carrier medium as recited in claim 27, wherein the carrier medium comprises a storage medium.

30. A computer-usable carrier medium, comprising:
first program instructions executable on a computer system for detecting an instruction to transmit to a display device a first information unit stored within a computer system;
second program instructions executable on the computer system for identifying a group of information units as corresponding to the first information unit, wherein the group links multiple information units including the first information unit;
third program instructions executable on the computer system for forwarding the group of information units together to the display device depending on the size of the group compared to the screen capacity of the display device before forwarding other information units; and
fourth program instructions executable on the computer system for collecting multiple information units into a group of information units using a policy.

31. A computer-usable carrier medium, comprising a data structure relating information units stored within a computer system to labels identifying groups of the information units, wherein the data structure is adapted for establishment of the groups by a user of the computer system.

32. The carrier medium as recited in claim 31, wherein the labels comprise an identical group label assigned to each information unit within a group.

33. An information-handling system, comprising:
a means for arranging multiple information units into groups by assigning a label to each of the multiple information units;
a display controller; and
a means for linking a group arrangement resulting from said arranging to the display controller, wherein the display controller is adapted to send the information units together to a display device in accordance with boundaries placed within the group arrangement, and further in accordance with a size of the group compared to a screen capacity of the display device.

34. The system as recited in claim 33, wherein said means for arranging comprises a data structure.

35. The system as recited in claim 33, wherein said means for arranging comprises a rules database.

36. The system as recited in claim 33, wherein said means for arranging comprises a control program adapted for communication with a rules database or data structure.

37. The system as recited in claim 33, further comprising a storage medium operably coupled to said display controller, wherein said storage medium is adapted for storing said group arrangement.

* * * * *